United States Patent [19]

Miller

[11] 4,432,155
[45] Feb. 21, 1984

[54] FISHING ROD
[75] Inventor: Earl Miller, Miami, Fla.
[73] Assignee: Larco Products, Inc., Miami, Fla.
[21] Appl. No.: 361,062
[22] Filed: Mar. 23, 1982
[51] Int. Cl.³ .................................... A01K 87/06
[52] U.S. Cl. ............................................. 43/22
[58] Field of Search ......................... 43/20, 22, 23
[56] References Cited
U.S. PATENT DOCUMENTS

| | | | |
|---|---|---|---|
| 888,075 | 5/1908 | Eshaur | 43/22 |
| 2,737,747 | 2/1956 | Benson et al. | 43/22 |
| 2,780,883 | 2/1957 | Macy | 43/22 |
| 3,276,160 | 10/1966 | Sarah | 43/22 |
| 3,310,904 | 3/1967 | Binvignat | 43/22 |
| 3,443,335 | 5/1969 | Guydos | 43/22 |
| 3,522,674 | 8/1970 | Hardesty | 43/22 |
| 4,050,179 | 9/1977 | Johnson | 43/22 |
| 4,077,150 | 3/1978 | Barnes | 43/22 |
| 4,083,141 | 4/1978 | Shedd et al. | 43/22 |

FOREIGN PATENT DOCUMENTS 1380199  3/1964  France ..................... 43/22

Primary Examiner—Nicholas P. Godici
Assistant Examiner—M. Jordan
Attorney, Agent, or Firm—Browdy and Neimark

[57] ABSTRACT

A fishing rod primarily intended to accommodate open-faced spinning reels is formed of three plastic components, namely a foregrip into which the rod blank of the rod is fitted, a reel seat on which the foot of the reel rests, and a rear grip threadedly engageable with the reel seat to trap the reel foot on the reel seat.

6 Claims, 3 Drawing Figures

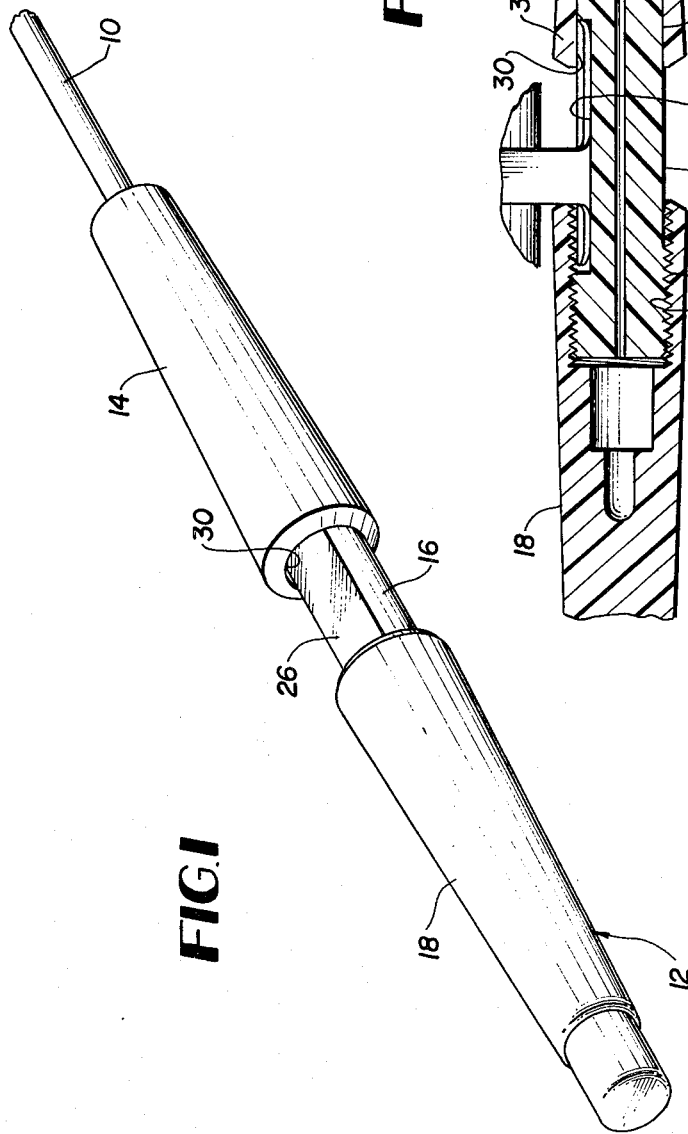
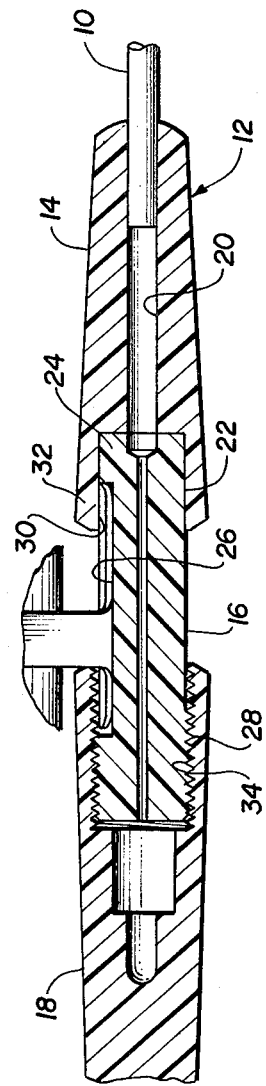
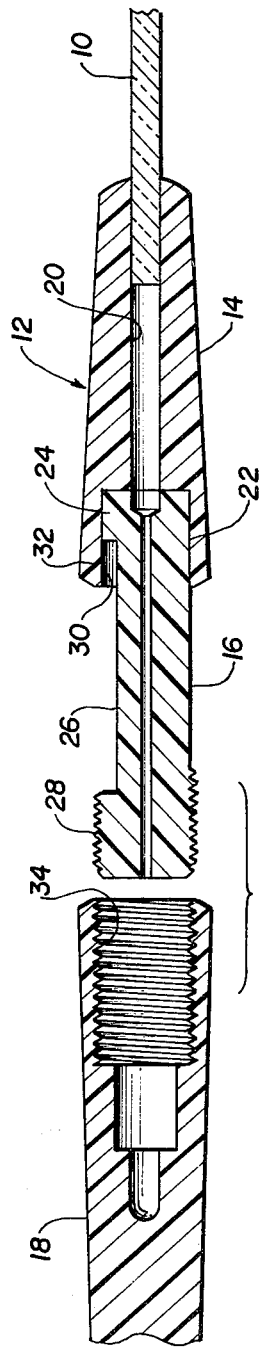

FISHING ROD

FIELD OF THE INVENTION

The present invention relates to a fishing rod and, more particularly, to a fishing rod handle intended primarily to accommodate open faced spinning reels.

BACKGROUND OF THE INVENTION

Fishing rods presently in use suffer from a number of disadvantages, particularly in the handle portion in which the fishing reel is seated. One problem with conventional tubular reel seats is that the foot of the reel does not sit firmly and the reel tends to rock from side to side. Another common fault with conventional reel seats is that lock nuts tend to loosen up during fishing and must be periodically retightened.

A third problem is that with conventional aluminum reel seats, corrosion often occurs, making it almost impossible to remove the reel if left on for some time.

Prior fishing rod handles suffer from other disadvantages including manufacturing and economic disadvantages. Thus, the conventional handle assembly consists of at least ten parts as follows: an ornamental front cap or winding check; a foregrip; a reel seat having a minimum of four parts including the barrel or body, the fixed front hood, the sliding rear hood and at least one lock nut; reel seat bushings used to adapt the reel seat to the rod blank; a rear grip; and an ornamental butt cap.

The procedure for assembling the conventional spinning handle is also complex and unduly increases the cost of manufacturing the rod. The conventional handle assembly procedure for a spinning rod is as follows: first the bushings are cemented into the reel seat; then the rear grip is slid down the rod blank and cemented into place; then the foregrip is slid down the rod blank and cemented into place; next the front end cap is slid down the rod blank and cemented into place; and lastly the rear grip is cemented into place.

SUMMARY OF THE INVENTION

It is, accordingly, an object of the present invention to overcome the deficiencies of the prior art, such as those indicated above.

It is another object of the instant invention to provide for an improved fishing rod.

It is yet another object to provide for an improved fishing rod handle.

It is still another object of the invention to provide for manufacturing such an improved fishing rod and fishing rod handle in a better, less expensive and more efficient manner.

It is a further object to provide an improved fishing rod having a partially integral handle of simplified construction formed of only three plastic components.

A fishing rod handle according to the instant invention is intended to accommodate open faced spinning reels, although it may be used for any kind of fishing reel. Such handle has a number of functional advantages as follows: it is comfortable to use it as there are no exposed threads or lock nuts under the hand; accordingly, the problem inherent in many prior fishing rod handles, where the base of the hand becomes sore because of constant contact between wet hands and the conventional exposed threads and lock nuts, is obviated.

The rod handle of the instant invention has a flat portion for the reel seat which forces the foot of the reel to sit rigidly rather than to rock from side to side as is common with conventional tubular reel seats. In addition, the reel is locked securely in place as opposed to prior devices using nuts which loosen up and must be periodically retightened.

In addition, the entire handle is made of plastic, preferably ABS, although other plastics such as polycarbonates, polyacetals, and other high-impact resins or blends may be used. The handle is accordingly very strong and is noncorrosive in salt water use. This obviates the problems inherent in prior fishing rod handles which use conventional aluminum reel seats, where corrosion will inevitably occur in salt water usage.

In addition to performance advantages as noted above, there are several manufacturing and economic advantages in the present invention. Thus, the entire assembly consists of only three parts, namely a foregrip portion, a reel seat portion, and a rear grip portion. These are individually molded such as by injection molding or by extrusion followed by machining, and their assembly is very simple. The rod blank is cemented to the front end of the foregrip and the foregrip is cemented to the reel seat. The rear grip is then simply screwed onto the reel seat section. It can thereby be seen that the three-piece construction is much simpler than the conventional handle consisting of at least ten parts, and the assembly steps of the three components are also much simpler than the conventional assembly involving at least six steps.

It is therefore apparent that in addition to improved function in fishing, considerable savings can be effected both in parts cost and in assembly labor. The rod blank does not run all the way through the handle as in a conventional construction, and therefore a shorter rod blank can be used to obtain a given length of rod. This can be a significant additional saving, particularly in the manufacture of high quality rods made of graphite fiber.

The simplicity of the new handle is made possible because each of the three parts performs more than one function in contrast to the conventional handle. These functions are as follows:

The foregrip acts not only to perform the same function (as a foregrip) in a conventional handle, but it further functions as an adapter. Various hole sizes can be cored into the front end to accept different rod diameters. In addition, the foregrip acts as a trap for the front end of the reel foot to hold the front end of the reel securely in place.

The reel seat acts as the main body of the handle containing the flat area for the reel foot to rest against. It also functions to maintain the foregrip in place, the two being cemented together. In additon, its back end is threaded to receive the butt grip when the latter is screwed onto the reel seat.

The butt grip acts not only as a butt grip for the rod, but it also acts as a trap for the back end of the reel foot to hold the back end of the reel securely. The butt grip is threaded internally to move forward and back to accommodate different lengths of reel foot.

Furthermore, the handle construction of the instant invention offers considerable flexibility in apppearance. Various colors of plastic are readily available so that the color of the handle can be made to match the color of the rod blank, color of reel, or both. As there are only three pieces, combinations of colors can also be made. Rather than having separate ornamental parts as is conventional in the prior art, the front and rear caps can be simulated respectively on the front and rear portions of the foregrip and butt grip so as to give the appearance that these are separate parts.

Other objects in addition to those set forth above, and the nature and further advantages of the instant invention will be apparent from the following detailed description of an embodiment of the instant invention, taken in conjunction with the drawing.

BRIEF DESCRIPTION OF DRAWING

FIG. 1 is a perspective view of an embodiment of the instant invention;

FIG. 2 is a exploded, sectional view taken in the axial direction, of the fishing rod of FIG. 1; and FIG. 3 is a sectional view similar to FIG. 2, with the parts assembled.

DETAILED DESCRIPTIoN OF THE EMBODIMENT

A fishing rod in accordance with the invention includes a rod blank 10 of more or less conventional construction and which may be formed of any of the usual materials such as fiberglas reinforced plastic or, in the case of most expensive rods, graphite fiber reinforced plastic. Connected to the end of the rod blank 10, such as by force-fitting and cementing of epoxy resin, is the rod handle shown generally at 12.

The rod handle is formed of three elements, namely a foregrip 14, a reel seat 16 and a rear grip 18. The rod blank 10 is united with the forward end of the foregrip 14 in an internal bore extending through the foregrip 14. As can be seen in FIG. 2, the rod blank 10 does not run all the way through the handle as in a conventional fishing rod, and therefore a shorter rod blank can be used to obtain a given length of fishing rod, thereby saving expensive construction material. As noted above, the rod blank 10 may be force-fitted within the bore 20 of the foregrip and cemented into place using a conventional adhesive, such as epoxy resin. A different size bore 20 can be provided depending on the diameter of the rod blank 10. As shown in the drawing, the shape of the foregrip is generally cylindrical with a slight frusto-conical taper.

The back end of the foregrip 14 is provided with a cylindrical bore 22 having an internal diameter, the same as the external diameter of the front end 24 of the reel seat. During construction, the foreward end 24 of the reel seat 16 is force-fitted and cemented, such as by the use of epoxy resin, into the bore 22 at the back end of the foregrip 14.

The reel seat 16 is of a generally cylindrical configuration having an intermediate flat portion 26 which serves as a seat for the foot of the reel intended to be used with the rod 12. The rear end of the reel seat 16 is provided with external threads 28 by which the butt grip 18 mates with the reel seat 16. As best seen in FIG. 2, a gap 30 is provided immediately behind the front end 24 of the reel seat 16 provided by the bore 22-forming lip 32 of the foregrip 14 and the flat portion 26 of the reel seat 16. Within this gap 30 is placed the front end of the foot of the reel, and is there held in place by the lip 32.

The butt grip 18, also of generally cylindrical shape, but with preferably a slight frusto-conical taper, is provided with an internal threaded bore 34 which screwingly mates with the external threads 28 of the reel seat 16. In use, with the reel seated on the flat portion 26 of the reel seat 16 with the front end of its foot within the gap 30, the butt grip 18 is screwed onto the threads 28 of the reel seat 16 until the front end of the butt grip 18 overlies the rear portion of the reel foot, the latter sitting on the back part of the flat portion 26. The butt grip is screwed on until the reel is held firmly in place.

It will be obvious to those skilled in the art that various changes may be made without departing from the scope of the invention and the invention is not to be considered limited to what is shown in the drawings and described in the specification.

What is claimed is:

1. In a fishing rod having a rod blank and a handle portion, the improvement wherein said handle portion is formed of a plastic foregrip portion made unitary with the end of said rod blank; a reel seat portion made integral with the rear portion of said foregrip; and a rear grip portion engageable and disengagable with the rear portion of said reel seat;

said reel seat having a flat portion for the seating thereon of the foot of a reel;

the back portion of said foregrip and the front portion of said reel seat cooperating to form a gap for receiving therewithin the front end of the foot of a reel; and said rear grip being engageable with the rear portion of said reel seat in such a way as to cause the foreward end of said rear grip to overly said flat portion of said reel seat to thereby overly and clamp therebetween the rear portion of a reel foot, and thereby hold a reel firmly in place on said flat portion.

2. A reel in accordance with claim 1 wherein said rear grip and said reel seat are engageable and disengageable by means of screw threads, said rear grip being internally threaded at its front end and said reel seat being externally threaded at its rear end.

3. A fishing rod in accordance with claim 2 wherein said foregrip, said reel seat and said rear grip are all of generally cylindrical shape.

4. A fishing rod in accordance with claim 3 wherein said foregrip, said reel seat and said rear grip are formed of ABS polymer.

5. A fishing reel in accordance with claim 4 wherein said rod blank is cemented to said foregrip with epoxy resin and said foregrip is cemented to said reel seat with epoxy resin.

6. A fishing rod in accordance with claim 1 wherein said foregrip is provided with a cylindrical bore at its rear end into which said reel seat is force-fitted, the front part of said flat portion extending into said bore to thereby form said gap.

* * * * *